United States Patent
Hayakawa et al.

(10) Patent No.: US 8,038,350 B2
(45) Date of Patent: Oct. 18, 2011

(54) HYDRODYNAMIC BEARING DEVICE

(75) Inventors: Yukitaka Hayakawa, Kuwana (JP); Jun Hirade, Kuwana (JP); Tetsuya Kurimura, Kuwana (JP)

(73) Assignee: NTN Corporation, Osaka-Fu (FR)

( * ) Notice: Subject to any disclaimer, the term of this patent is extended or adjusted under 35 U.S.C. 154(b) by 650 days.

(21) Appl. No.: 10/584,314

(22) PCT Filed: Jan. 12, 2005

(86) PCT No.: PCT/JP2005/000556
§ 371 (c)(1),
(2), (4) Date: May 23, 2007

(87) PCT Pub. No.: WO2005/068858
PCT Pub. Date: Jul. 28, 2005

(65) Prior Publication Data
US 2008/0037918 A1  Feb. 14, 2008

(30) Foreign Application Priority Data
Jan. 14, 2004  (JP) .................. 2004-006950

(51) Int. Cl.
*F16C 17/10* (2006.01)
*F16C 32/06* (2006.01)
(52) U.S. Cl. ............. 384/100; 301/10; 29/898; 384/228
(58) Field of Classification Search .................. 384/100, 384/107, 114–115, 132–133, 119, 121, 228; 360/99.04, 99.08; 310/90, 67 R, 90.5, 10; 29/898; 29/898.02
See application file for complete search history.

(56) References Cited

U.S. PATENT DOCUMENTS

| | | | | |
|---|---|---|---|---|
| 5,704,718 A | * | 1/1998 | Mori et al. | 384/279 |
| 5,822,846 A | * | 10/1998 | Moritan et al. | 384/115 |
| 6,010,246 A | * | 1/2000 | Gomyo et al. | 384/115 |
| 6,250,807 B1 | * | 6/2001 | Mori et al. | 384/100 |
| 6,339,273 B1 | | 1/2002 | Higuchi | |
| 6,340,854 B1 | * | 1/2002 | Jeong | 310/90 |
| 6,485,179 B1 | * | 11/2002 | Takahashi et al. | 384/132 |
| 6,609,829 B2 | * | 8/2003 | Saito et al. | 384/100 |
| 6,657,340 B2 | * | 12/2003 | Obara | 310/90 |
| 6,685,356 B2 | * | 2/2004 | Hirata | 384/100 |
| 6,733,180 B2 | * | 5/2004 | Nakamura | 384/100 |
| 6,817,766 B2 | * | 11/2004 | Gomyo | 384/132 |
| 6,831,812 B2 | * | 12/2004 | Sode et al. | 360/99.08 |

(Continued)

FOREIGN PATENT DOCUMENTS

GB    2197427 A    *    5/1988

(Continued)

*Primary Examiner* — Marcus Charles
(74) *Attorney, Agent, or Firm* — Wenderoth, Lind & Ponack, L.L.P.

(57) ABSTRACT

In order to prevent degradation of accuracy and decrease of strength when a hydrodynamic bearing device is assembled and to reduce a cost of the hydrodynamic bearing device, a guide face serving as a guide when a disc hub is press fitted into a shaft member is formed on the shaft member. Then, the guide face, an outer circumferential surface of the shaft member adjacent to the guide face, and a boundary portion between the guide face and the outer circumferential surface are ground simultaneously, thereby forming a blunting portion having a radius r in the boundary portion. Thus, no edge remains between the guide face and the outer circumferential surface. Therefore, press-fitting resistance when the disc hub is press fitted to an end of the shaft member can be reduced.

17 Claims, 3 Drawing Sheets

U.S. PATENT DOCUMENTS

| | | | |
|---|---|---|---|
| 6,851,859 B2 * | 2/2005 | Takehana et al. | 29/898.02 |
| 6,900,568 B2 * | 5/2005 | LeBlanc et al. | 384/119 |
| 6,939,046 B2 * | 9/2005 | Oelsch | 384/107 |
| 7,005,768 B2 * | 2/2006 | Tamaoka et al. | 310/90 |
| 7,008,112 B2 * | 3/2006 | Yamashita et al. | 384/119 |
| 7,073,945 B2 * | 7/2006 | Aiello et al. | 384/107 |
| 7,147,376 B2 * | 12/2006 | Shimizu et al. | 384/107 |
| 7,201,516 B2 * | 4/2007 | Haga | 384/100 |
| 2002/0018603 A1 * | 2/2002 | Narita | 384/100 |
| 2002/0025089 A1 * | 2/2002 | Mori et al. | 384/100 |
| 2003/0113045 A1 * | 6/2003 | Fujinaka | 384/114 |
| 2003/0184911 A1 * | 10/2003 | Sode et al. | 360/99.08 |
| 2003/0207715 A1 | 11/2003 | Sugiyama et al. | |
| 2004/0032175 A1 * | 2/2004 | Grantz et al. | 310/90 |

FOREIGN PATENT DOCUMENTS

| | | |
|---|---|---|
| JP | H03-29723 | 1/1989 |
| JP | 08-212687 | 8/1996 |
| JP | 09-105418 | 4/1997 |
| JP | 2000-270530 | 9/2000 |
| JP | 2003-322136 | 11/2003 |
| JP | 2004-282955 | 10/2004 |

* cited by examiner

HYDRODYNAMIC BEARING DEVICE

BACKGROUND OF THE INVENTION

I. Technical Field

The present invention relates to a hydrodynamic bearing device that supports a shaft member so as to be freely rotatable in a non-contact manner by an action of the dynamic pressure of lubricating oil generated within a radial bearing gap. This hydrodynamic bearing device is suitable for use in a spindle motor for information equipment including magnetic disc devices such as an HDD and an FDD, optical disc devices such as a CD-ROM drive, a CD-R/RW drive, and a DVD-ROM/RAM drive, and magnetooptical disc devices such as an MD drive and an MO drive, a polygon scanner motor of a laser beam printer (LBP), a color wheel for a projector, or a small motor of electric equipment such as an axial fan.

II. Description of the Related Art

For the aforementioned various motors, improvement of rotational accuracy, increase of an operation speed, reduction of a cost, reduction of noises and the like are needed. One of components that determine those performance requirements is a bearing for supporting a spindle of the motor. In recent years, the use of a hydrodynamic bearing device having excellent characteristics related to the above performance requirements is studied, or such a hydrodynamic bearing device has been actually used.

This type of hydrodynamic bearing device includes a radial bearing portion for supporting a shaft member to be freely rotatable in a radial direction and a thrust bearing portion for supporting the shaft member to be freely rotatable in a thrust direction. The radial bearing portion generates oil film in a radial bearing gap that is formed between an inner circumferential surface of a bearing sleeve and an outer circumferential surface of the shaft member, by an action of a dynamic pressure generated by relative rotation between the shaft member and the bearing sleeve, thereby supporting the shaft member in the radial direction in a non-contact manner. As the thrust bearing portion, a type which forms oil film in a bearing gap (thrust bearing gap) by an action of a dynamic pressure so as to support the shaft member in a non-contact manner (this type is called as a hydrodynamic bearing) like the radial bearing portion and a type which supports an end of the shaft member by a thrust plate in a contact manner (this type is called as a pivot bearing) are known.

According to a conventional technique, the shaft member used in this type of hydrodynamic pressure bearing device is fabricated by roughly shaping metal material by a turning process and thereafter grinding the outer circumferential surface of the shaped metal material and the like which require high fabrication accuracy (see Japanese Patent Laid-Open Publication No. 2002-310159).

In a hydrodynamic bearing device that is incorporated in a spindle motor of a disc device such as an HDD, a member for supporting a disc, e.g., a disc hub, is press fitted and fixed at the tip end of the shaft member. When the disc hub is press fitted while being inclined, shaft movement in an axial direction increases. Therefore, after the hydrodynamic bearing device is assembled, it is necessary to correct inclination while the movement of the shaft is measured. This correction of inclination increases the cost of the hydrodynamic bearing device. Moreover, when the disc hub is inclined, the press-fitting force becomes excessively large. Thus, a large load is applied to various portions of the bearing device, so that the decrease of the accuracy, the decrease of strength of a bonded portion, and the like may be caused.

SUMMARY OF THE INVENTION

Therefore, it is an object of the present invention to prevent degradation of accuracy and decrease of strength caused when a hydrodynamic bearing device is assembled and to reduce a cost of the hydrodynamic bearing device.

As one example of measures for suppressing inclination of a disc hub, it is considered to form a tapered guide face at an end (that is an end from which the disc hub is inserted) of a shaft member. This guide face does not directly affect rotational accuracy of a bearing and the like. Thus, it is not necessary to finish the guide face with high accuracy. Therefore, during grinding of the shaft member, as shown in FIG. 4, it is sufficient that only an outer circumferential surface 21 of the shaft member 20 is ground on a grind stone 30 and the guide face 22 is left in a state in which it is cut by turning but is not ground.

However, when only the outer circumferential surface 21 is ground, a boundary between the outer circumferential surface 21 and the guide face 22 of the shaft member 20 turns into an edge that is called as a pin angle. This edge serves as resistance when the disc hub is press fitted toward the end of the shaft member and is fixed at that end. In order to remove the edge, barreling of the shaft member 20 after the grinding of the outer circumferential surface 21 is considered. However, the barreling may make the ground face rough and may scar the ground face. Therefore, the barreling is not preferable from a viewpoint of the function of the bearing.

Based on the above consideration, according to the present invention, a hydrodynamic bearing device comprises: a shaft member; and a radial bearing portion having a radial bearing gap formed around an outer circumference of the shaft member and supporting the shaft member in a radial direction in a non-contact manner by an action of a dynamic pressure of fluid generated in the radial bearing gap, wherein the shaft member has a guide face serving as a guide when another member is press fitted into the shaft member, and a blunting portion formed between the guide face and the outer circumferential surface of the shaft member adjacent to the guide face, the blunting portion having a shape in which an edge is blunted.

The guide face is formed in a shape in which its diameter is smaller than that of the adjacent outer circumferential surface of the shaft member, for example, a tapered shape having a diameter that becomes smaller upward, from a viewpoint of its function. Although the guide face can be arranged at any location on the shaft member, it is usually arranged at an upper end thereof. One example of the another member that is to be press fitted into the shaft member is a disc hub for holding a disc.

By providing the guide face serving as a guide when the another member is press fitted into the shaft member in the aforementioned manner, the another member is guided by the tapered guide face of the shaft member while being press fitted into the shaft member. Thus, inclination of the another member during the press-fitting can be suppressed. Moreover, since the blunting portion in which the edge is blunted is provided between the guide face and the outer circumferential surface of the shaft member adjacent to the guide face, the guide face and the adjacent outer circumferential surface can continue smoothly with no edge between them. Thus, press-fitting resistance when the another member is press fitted can be suppressed, and smooth press-fitting of the another member without inclination can be achieved. Therefore, improvement of accuracy of a motor and cost reduction thereof can be achieved. Furthermore, it is possible to prevent damages of various portions of the bearing device and decrease of strength of a bonded portion thereof by application of an excessively large press-fitting force.

The guide face, the outer circumferential surface of the shaft member that is adjacent to the guide face, and the blunting portion can be formed by grinding. In this case, not only the outer circumferential surface of the shaft member, but also the blunting portion, are finished with high accuracy. Therefore, the press-fitting resistance can be further reduced.

Considering processing efficiency, it is desirable that the guide face, the aforementioned outer circumferential surface of the shaft member, and the blunting portion be ground simultaneously.

In order to reduce the press-fitting resistance, it is preferable to make generating lines of the guide face, the outer circumferential surface of the shaft member adjacent to the guide face, and the blunting portion continue as smoothly as possible. In order to achieve such continuity easily, it is desirable to form the blunting portion to have a curved surface.

By forming a motor by the aforementioned hydrodynamic bearing device, a rotor magnet, and a stator coil, the motor suitable for the aforementioned information equipment (a spindle motor, a polygon scanner motor, and other small motors) can be provided.

The hydrodynamic bearing device according to the present invention having: a shaft member; and a radial bearing portion having a radial bearing gap formed around an outer circumference of the shaft member and supporting the shaft member in a radial direction in a non-contact manner by an action of a dynamic pressure of fluid generated in the radial bearing gap, can be manufactured by forming, on the shaft member, a guide face serving as a guide when another member is press fitted into the shaft member and thereafter simultaneously grinding the guide face, the outer circumferential surface of the shaft member adjacent to the guide face, and a boundary portion between them.

According to the present invention, it is possible to prevent degradation of accuracy and decrease of strength when the hydrodynamic bearing device is assembled. In addition, the cost of the hydrodynamic bearing device can be reduced.

DETAILED DESCRIPTION OF THE INVENTION

Preferred embodiments of the present invention will now be described below.

Figure 1:
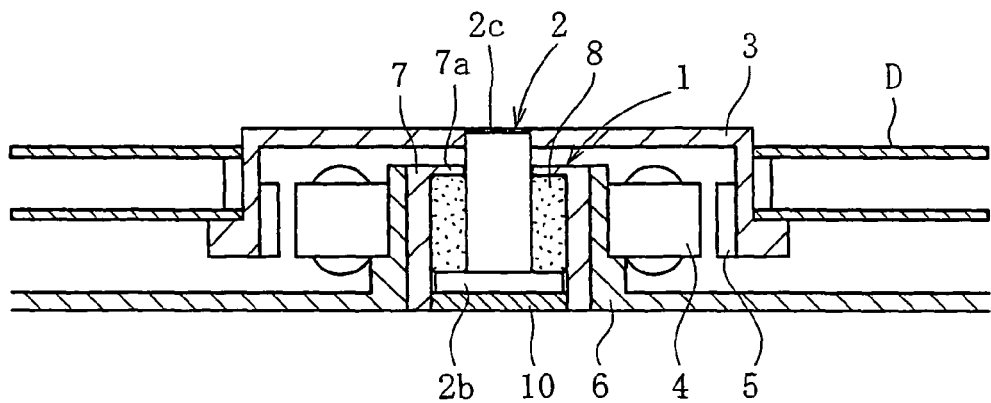
FIG. 1 is a vertical cross-sectional view of a spindle motor including a hydrodynamic bearing device of the present invention therein.

FIG. 1 shows a spindle motor used in a disc drive such as an HDD, as an exemplary motor incorporating a hydrodynamic bearing device therein. The motor includes a hydrodynamic bearing device 1 for supporting a shaft member 2 to be freely rotatable in a non-contact manner, a rotation member 3 (disc hub) attached to the shaft member 2, a stator coil 4 and a rotor magnet 5 that are opposed to each other with a radial gap interposed therebetween, for example, and a bracket 6. The stator coil 4 is attached to an outer circumference of the bracket 6. The rotor magnet 5 is attached to an inner circumference of the disc hub 3. The disc hub 3 is arranged to hold one or more discs D such as magnetic discs, in its outer circumferential portion. When a current flows through the stator coil 4, an exciting force between the stator coil 4 and the rotor magnet 5 rotates the rotor magnet 5. With the rotation of the rotor 5, the disc hub 3 and the shaft member 2 are rotated as a unit.

Figure 2:
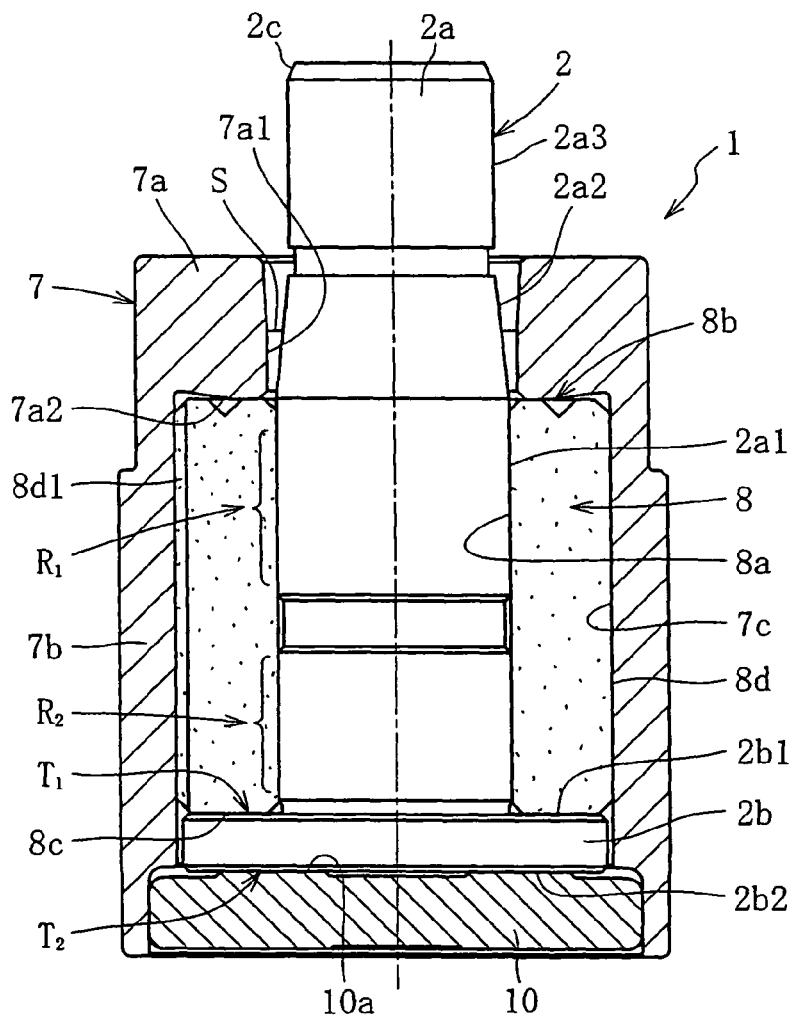
FIG. 2 is a vertical cross-sectional view of the above hydrodynamic bearing device.

FIG. 2 shows a first embodiment of the hydrodynamic bearing device 1. This hydrodynamic bearing device 1 according to this embodiment includes a housing 7, a bearing sleeve 8, and a thrust member 10 that are fixed to the housing 7, and a shaft member 2 inserted into the bearing sleeve.

A first radial bearing portion R1 and a second radial bearing portion R2 are provided between an inner circumferential surface 8$a$ of the bearing sleeve 8 and an outer circumferential surface 2$a$1 of a shaft portion 2$a$ of the shaft member 2. The first and second radial bearing portions R1 and R2 are arranged to be axially away from each other. Moreover, a first thrust bearing portion T1 is provided between a lower end face 8$c$ of the bearing sleeve 8 and an upper end face 2$b$1 of a flange portion 2$b$ of the shaft member 2, while a second thrust bearing portion T2 is provided between an end face 10$a$ of the thrust member 10 and a lower end face 2$b$2 of the flange portion 2$b$. For convenience of description, the side of the thrust member 10 is assumed to be a lower side and the opposite side is assumed to be an upper side.

The housing 7 is made of a soft metal material such as brass, or a resin material such as a thermoplastic material, for example. In the shown example, the housing 7 includes a cylindrical side portion 7$b$ and an annular seal portion 7$a$ that is formed integrally with the side portion 7$b$ and extends from an upper end of the side portion 7$b$ inward in the radial direction. An inner circumferential surface 7$a$1 of the seal portion 7$a$ is opposed to a tapered face 2$a$2 provided on the outer circumference of the shaft portion 2$a$ with a predetermined seal space S interposed therebetween. The tapered face 2$a$2 of the shaft portion 2$a$ has a diameter that gradually decreases upward (toward the outside with respect to the housing 7), and serves as a taper seal by rotation of the shaft member 2.

The shaft member 2 is formed by roughly shaping a metal material such as stainless steel by turning, or forging, and then grinding the shaped metal material, for example. The shaft member 2 in the shown example includes the shaft portion 2$a$ and the flange portion 2$b$ provided at a lower end of the shaft portion 2$a$. The shaft portion 2$a$ and the flange portion 2$b$ are formed and shaped integrally. Alternatively, the shaft portion 2$a$ and the flange portion 2$b$ are formed as separate components. In this case, the shaft member 2 is formed by press fitting the flange portion 2$b$ into the shaft portion 2$a$.

Figure 3:
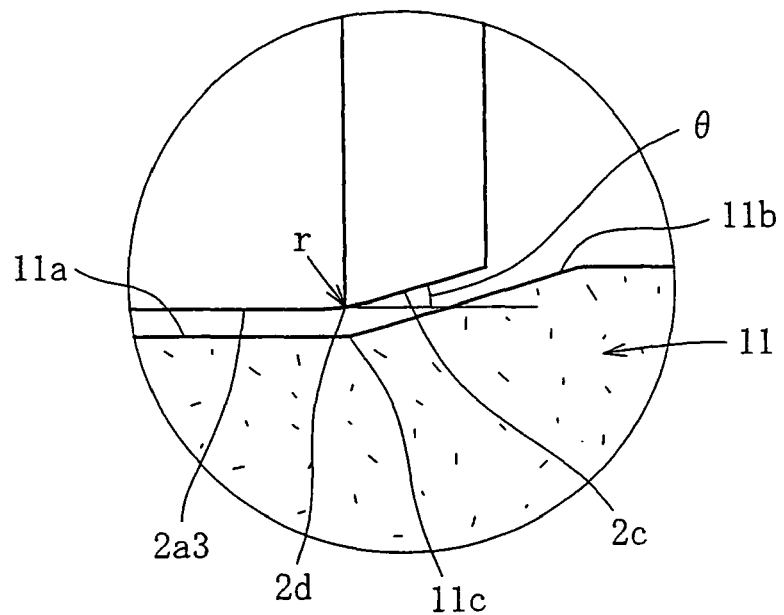
FIG. 3 is a cross-sectional view in which a process for grinding a shaft member according to the present invention is enlarged.
Figure 4:
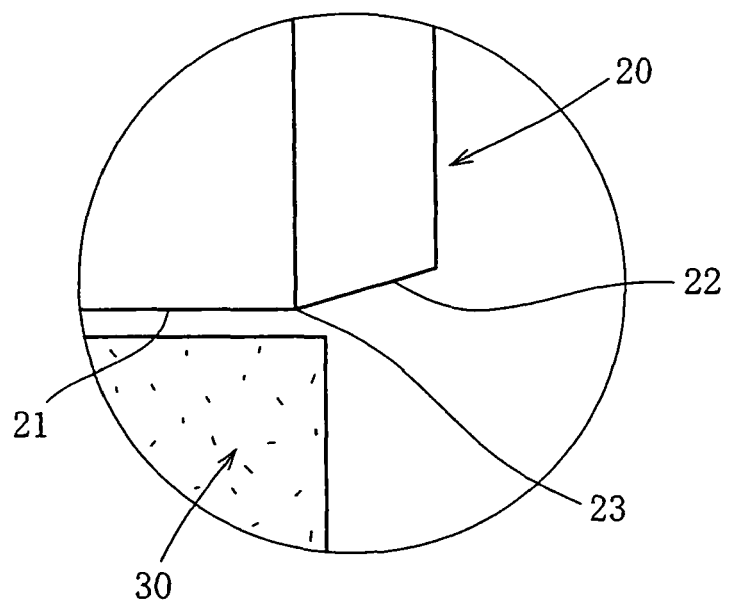
FIG. 4 is a vertical cross-sectional view in which a comparative example of the grinding process for the shaft member is enlarged.

As shown in FIG. 3, at an upper end of the shaft portion 2$a$ is formed a tapered guide face 2$c$. A taper angle $\theta$ of the guide face 2$c$ (angle of inclination with respect to the center of the shaft) is set to fall within a range from about 5° to about 20°. In a boundary portion between the guide face 2$c$ and the outer circumferential surface 2$a$3 of the shaft member 2 that is adjacent to the guide face 2$c$ (hereinafter, simply referred to as "adjacent outer circumferential surface"), no edge remains. Instead, a blunting portion 2$d$ having a shape in which an edge is blunted is formed between the guide face 2$c$ and the adjacent outer circumferential surface 2$a$3. In the present embodiment, the blunting portion 2$d$ has a curved surface having a radius r, and is smoothly connected with the guide face 2c and the adjacent outer circumferential surface 2a3.

In the present embodiment, the blunting portion 2d is formed and shaped by simultaneously grinding the aforementioned boundary portion, the guide face 2c, and the adjacent outer circumferential surface 2a3. This simultaneous grinding is carried out by using a grind stone 11 having a straight portion 11a corresponding to the adjacent outer circumferential surface 2a3, a tapered portion 11b corresponding to the guide face 2c, and a curved portion 11c corresponding to the blunting portion 2d. The curved portion 11c of the grind stone 11 is formed in a range of R0.1 to R0.5. The straight portion 11a and the tapered portion 11b of the grind stone 11 are arranged to smoothly continue via the curved portion 11c. By grinding the outer circumference of the shaft member 2 on the aforementioned grind stone 11, the guide face 2c, the blunting portion 2d, and the adjacent outer circumferential surface 2a3 form a continuous plane with no edge.

The bearing sleeve 8 is formed to be cylindrical, for example, from a porous material formed by sintered metal, in particular from a porous material of sintered metal mainly containing copper. The bearing sleeve 8 is fixed at a predetermined position on the inner circumferential surface 7c of the housing 7.

On the inner circumferential surface 8a of the bearing sleeve 8, two regions, i.e., an upper region and a lower region that serve as radial bearing faces of the first radial bearing portion R1 and the second radial bearing portion R2, respectively, are provided to be axially away from each other. In each of the two regions, a plurality of dynamic pressure generating grooves arranged in a herringbone pattern, for example, are formed. On the outer circumferential surface 8d of the bearing sleeve 8, one or more axial grooves 8d1 are formed to extend over the entire axial length. The upper end face 8b of the bearing sleeve 8 is in contact with an inner side face 7a2 of the seal portion 7a in its inner region in the radial direction.

On the lower end face 8c of the bearing sleeve 8 (or the upper end face 2b1 of the flange portion 2b), which serves as a thrust bearing face of the first thrust bearing portion T1, a plurality of dynamic pressure generating grooves that are spirally arranged, for example, are formed. The dynamic pressure generating grooves may be arranged in a herringbone pattern or in a radial pattern, for example.

The thrust member 10 is formed of a metal material such as brass, or a resin material, for example, and is fixed at a lower end of the inner circumferential surface 7c of the housing 7. On the end face 10a of the thrust member 10 (or the lower end face 2b2 of the flange portion 2b), which serves as a thrust bearing face of the second thrust bearing portion T2, a plurality of dynamic pressure generating grooves arranged in a herringbone pattern, for example, are formed. Those dynamic pressure generating grooves may be arranged spirally or radially, for example.

In assembly of the hydrodynamic bearing device 1 of the present embodiment, first, the bearing sleeve 8 is fixed on the inner circumference of the housing 7 and the shaft portion 2a of the shaft member 2 is inserted into the inner circumference of the bearing sleeve 8. Then, the bottom of the housing 7 is closed and sealed with the thrust member 10, and thereafter an inner space of the housing 7 sealed with the seal portion 7a, including inner pores of the bearing sleeve 8, is filled with a lubricating oil. A surface level of the lubricating oil is kept within a range of the seal space S.

When the shaft member 2 is rotated, the regions (upper and lower regions) of the inner circumferential surface 8a of the bearing sleeve 8 serve as the radial bearing faces and are opposed to the outer circumferential surface 2a1 of the shaft portion 2a via the radial bearing gaps. Moreover, the region of the lower end face 8c of the bearing sleeve 8 serves as the thrust bearing face, and is opposed to the upper end face 2b1 of the flange portion 2b via the thrust bearing gap, while the region of the end face 10a of the thrust member 10 serves as the thrust bearing face, and is opposed to the lower end face 2b2 of the flange portion 2b via the thrust bearing gap. With the rotation of the shaft member 2, a dynamic pressure of the lubricating oil is generated in the radial bearing gap, so that the shaft portion 2a of the shaft member 2 is supported to be freely rotatable in the radial direction in a non-contact manner by the lubricating oil film formed in the radial bearing gap. Thus, the first radial bearing portion R1 and the second radial bearing portion R2 that support the shaft member 2 to be freely rotatable in the radial direction in a non-contact manner are formed. At the same time, a dynamic pressure of the lubricating oil is also generated in the thrust bearing gap, so that the flange portion 2b of the shaft member 2 is supported to be freely rotatable in both thrust directions in a non-contact manner by the lubricating oil film formed in the thrust bearing gap. In this manner, the first thrust bearing portion T1 and the second thrust bearing portion T2 that support the shaft member 2 to be freely rotatable in the thrust directions in a non-contact manner are formed.

After completion of the assembly of the aforementioned hydrodynamic bearing device 1, when a motor is assembled, a disc hub 3 is press fitted into the shaft member 2 so as to be fixed at the upper end of the shaft portion 2a of the shaft member 2. During the press-fitting, the guide face 2c provided at the upper end of the shaft portion 2 serves as a guide for the disc hub 3 that is press fitted. Thus, the disc hub 3 is guided by the tapered guide face 2c, so that inclination of the disc hub 3 during the press-fitting can be suppressed. Moreover, since the blunting portion 2d having an R shape is provided between the guide face 2c and the adjacent outer circumferential surface 2a3, press-fitting resistance can be reduced. Thus, it is possible to smoothly press fit the disc hub 3 without inclining it. This can improve the accuracy of the hydrodynamic bearing device 1 and reduce the cost of the motor. Furthermore, damage of various portions of the hydrodynamic bearing device and decrease of strength of a bonded portion thereof due to the application of excess press-fitting force can be also prevented.

In the above embodiment, the thrust bearing portions T1 and T2 (see FIG. 2) are formed by non-contact hydrodynamic bearings. However, the present invention can also be applied to another hydrodynamic bearing device (not shown) in which the radial bearing portions R1 and R2 are formed by hydrodynamic bearings while thrust bearing portions are formed by pivot bearings.

Figure 5A:
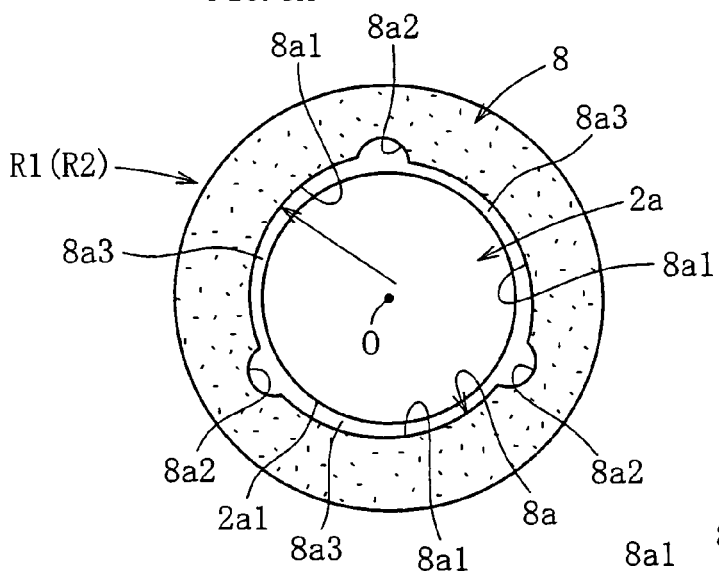
FIG. 5 is a sectional view of a radial bearing portion in a hydrodynamic bearing device according to another embodiment of the present invention.

The radial bearing portions R1 and R2 can also be formed by multi-arc bearings. FIG. 5A shows an example thereof, in which a plurality of arcuate surfaces 8a1 are formed in the areas of the inner peripheral surface 8a of the bearing sleeve 8 constituting the respective radial bearing surfaces of the first radial bearing portion R1 and the second radial bearing portion R2 (also referred to as the "tapered bearings"). The arcuate surfaces 8a1 are eccentric arcuate surfaces whose centers are offset from the rotation axis O by the same distance, and are formed at equal intervals in the circumferential direction. Between the eccentric arcuate surfaces 8a1, there are formed axial separation grooves 8a2.

By inserting the shaft portion 2a of the shaft member 2 into the bore defined by the inner peripheral surface 8a of the bearing sleeve 8, the radial bearing gaps of the first and second radial bearing portions R1 and R2 are formed between the eccentric arcuate surfaces 8a1 and separation grooves 8a2 of the bearing sleeve 8 and the circular outer peripheral surface 2a of the shaft portion 2a. Of the radial bearing gaps, the areas opposed to the eccentric arcuate surfaces 8a1 constitute wedge-like gaps 8a3 gradually reduced in gap width in one circumferential direction. The width-reducing direction of the wedge-like gaps 8a3 coincides with the rotating direction of the shaft member 2.

Figure 5B:
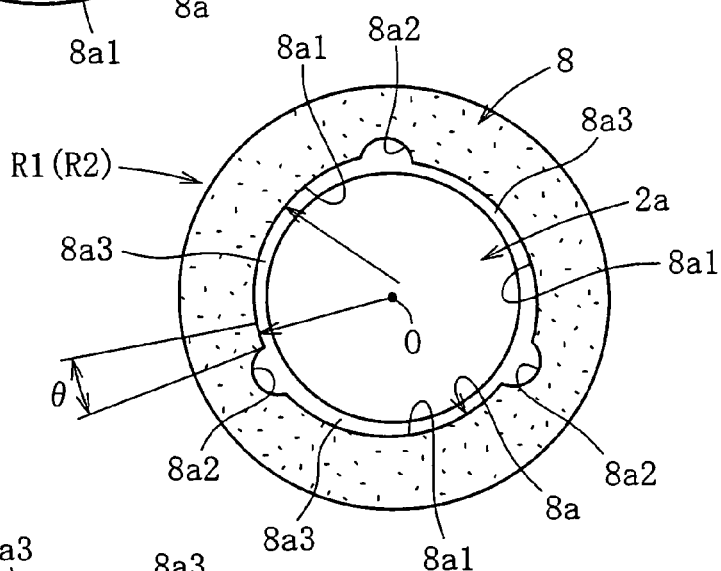
Figure 5C:
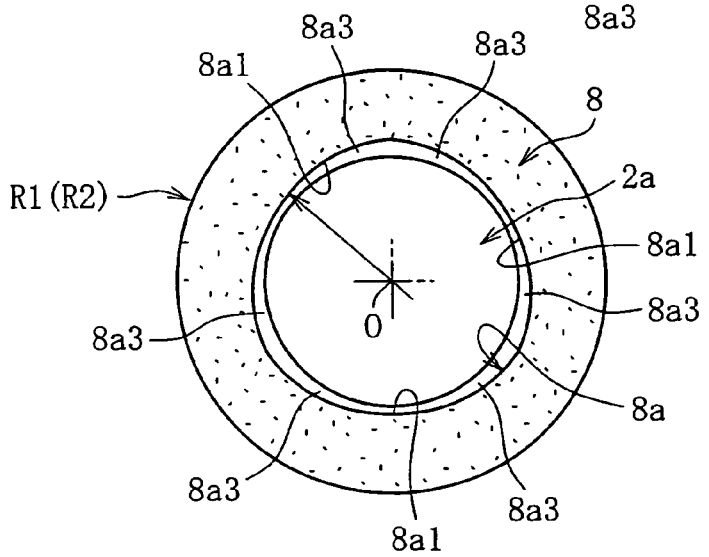

FIGS. 5B and 5C show other embodiments of the multi-arc bearings forming the first and second radial bearing portions R1 and R2.

Of these, in the embodiment shown in FIG. 5B, the construction shown in FIG. 5A is modified such that predetermined areas θ on the minimum gap side of the eccentric arcuate surfaces 8a1 are formed by concentric arcs which have the rotation axis O as their centers. Thus, in each predetermined area θ, the radial bearing gap (minimum gap) is fixed. A multi-arc bearing thus constructed is also referred to as a tapered flat bearing.

In FIG. 5C, the areas of the inner peripheral surface 8a of the bearing sleeve 8 constituting the radial bearing surfaces are formed by three arcuate surfaces 8a1, with the centers of the three arcuate surfaces 8a1 being offset by the same distance from the rotation axis O. In each of the areas defined by the three eccentric arcuate surfaces 8a1, the radial bearing gap is configured so as to be gradually diminished in both circumferential directions.

While the multi-arc bearings of the first and second radial bearing portions R1 and R2 are all three-arc bearings, this should not be construed restrictively; it is also possible to adopt a so-called four-arc bearing, five-arc bearing, or, further, a multi-arc bearing with six arcs or more. Further, apart from the construction in which two radial bearing portions are axially spaced apart from each other as in the case of the radial bearing portions R1 and R2, it is also possible to adopt a construction in which a single radial bearing portion is provided so as to extend over the upper and lower areas of the inner peripheral surface of the bearing sleeve 8.

Further, while in the above embodiment multi-arc bearings are adopted as the radial bearing portions R1 and R2, it is also possible to adopt a bearing of some other type. For example, although not shown, it is also possible to use, in the area of the inner peripheral surface 8a of the bearing sleeve 8 constituting the radial bearing surface, a step bearing in which there are formed dynamic pressure grooves in the form of a plurality of axial grooves.

The invention claimed is:

1. A hydrodynamic bearing device for a spindle motor of a disk drive device for information equipment, the hydrodynamic bearing device comprising:
a shaft member; and
a radial bearing portion having a radial bearing gap formed around an outer circumference of the shaft member and supporting the shaft member in a radial direction in a non-contact manner by an action of a dynamic pressure of fluid generated in the radial bearing gap, wherein
the shaft member has a tapered guide face serving as a guide when another member for holding a disk is press fitted into the shaft member, a blunting portion is formed between the guide face and the outer circumferential surface of the shaft member in an entire circumference of the shaft member, the blunting portion being a curved surface that is smoothly continuous to the guide face and the outer circumferential surface of the shaft member without forming an edge.

2. A hydrodynamic bearing device as claimed in claim 1, wherein
the guide face, the outer circumferential surface of the shaft member adjacent to the guide face, and the blunting portion are formed by grinding.

3. A hydrodynamic bearing device as claimed in claim 2, wherein
the another member that is to be press fitted into the shaft member is a disc hub for holding a disc.

4. A motor comprising a hydrodynamic bearing device as claimed in claim 2, a rotor magnet, and a stator coil.

5. A hydrodynamic bearing device as claimed in claim 2, wherein
the blunting portion is formed to have a curved surface.

6. A hydrodynamic bearing device as claimed in claim 5, wherein
the another member that is to be press fitted into the shaft member is a disc hub for holding a disc.

7. A motor comprising a hydrodynamic bearing device as claimed in claim 5, a rotor magnet, and a stator coil.

8. A hydrodynamic bearing device as claimed in claim 2, wherein
the guide face, the outer circumferential surface of the shaft member, and the blunting portion are ground simultaneously.

9. A hydrodynamic bearing device as claimed in claim 8, wherein
the blunting portion is formed to have a curved surface.

10. A hydrodynamic bearing device as claimed in claim 9, wherein
the another member that is to be press fitted into the shaft member is a disc hub for holding a disc.

11. A motor comprising a hydrodynamic bearing device as claimed in claim 9, a rotor magnet, and a stator coil.

12. A hydrodynamic bearing device as claimed in claim 8, wherein
the another member that is to be press fitted into the shaft member is a disc hub for holding a disc.

13. A motor comprising a hydrodynamic bearing device as claimed in claim 8, a rotor magnet, and a stator coil.

14. A hydrodynamic bearing device as claimed in claim 1, wherein
the another member that is to be press fitted into the shaft member is a disc hub for holding a disc.

15. A motor comprising a hydrodynamic bearing device as claimed in claim 14, a rotor magnet, and a stator coil.

16. A motor comprising a hydrodynamic bearing device as claimed in claim 1, a rotor magnet, and a stator coil.

17. A method for manufacturing a hydrodynamic bearing device having a shaft member, and a radial bearing portion having a radial bearing gap formed around an outer circumference of the shaft member and supporting the shaft member in a radial direction in a non-contact manner by an action of a dynamic pressure of fluid generated in the radial bearing gap, the method comprising
forming, on the shaft member, a flat face at an apex thereof and a guide face serving as a guide when another member is press fitted into the shaft member and,
thereafter simultaneously grinding the guide face, an outer circumferential surface of the shaft member that is adjacent to the guide face, and a boundary portion between the guide face and the outer circumferential surface of the shaft member adjacent to the guide face so that a blunting portion is formed in an entire circumference of the shaft member at the boundary portion in the shape of a curved surface that is smoothly continuous to the guide face and to the outer circumferential surface without forming an edge.

* * * * *